Figures 1, 2:
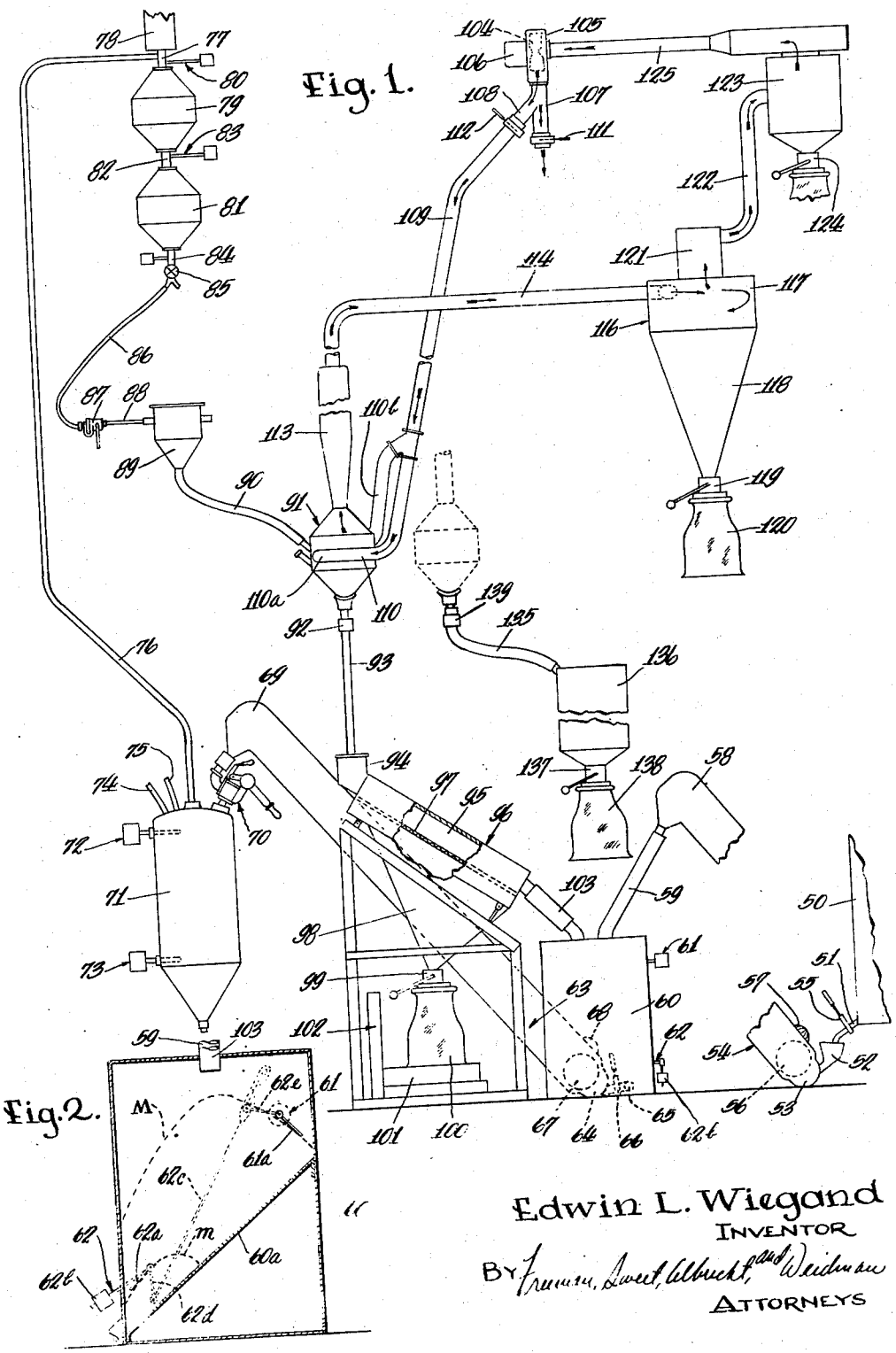

May 1, 1945.  E. L. WIEGAND  2,375,057
CONVEYING SYSTEM
Filed Dec. 7, 1939   6 Sheets-Sheet 1

Edwin L. Wiegand
INVENTOR

BY
ATTORNEYS

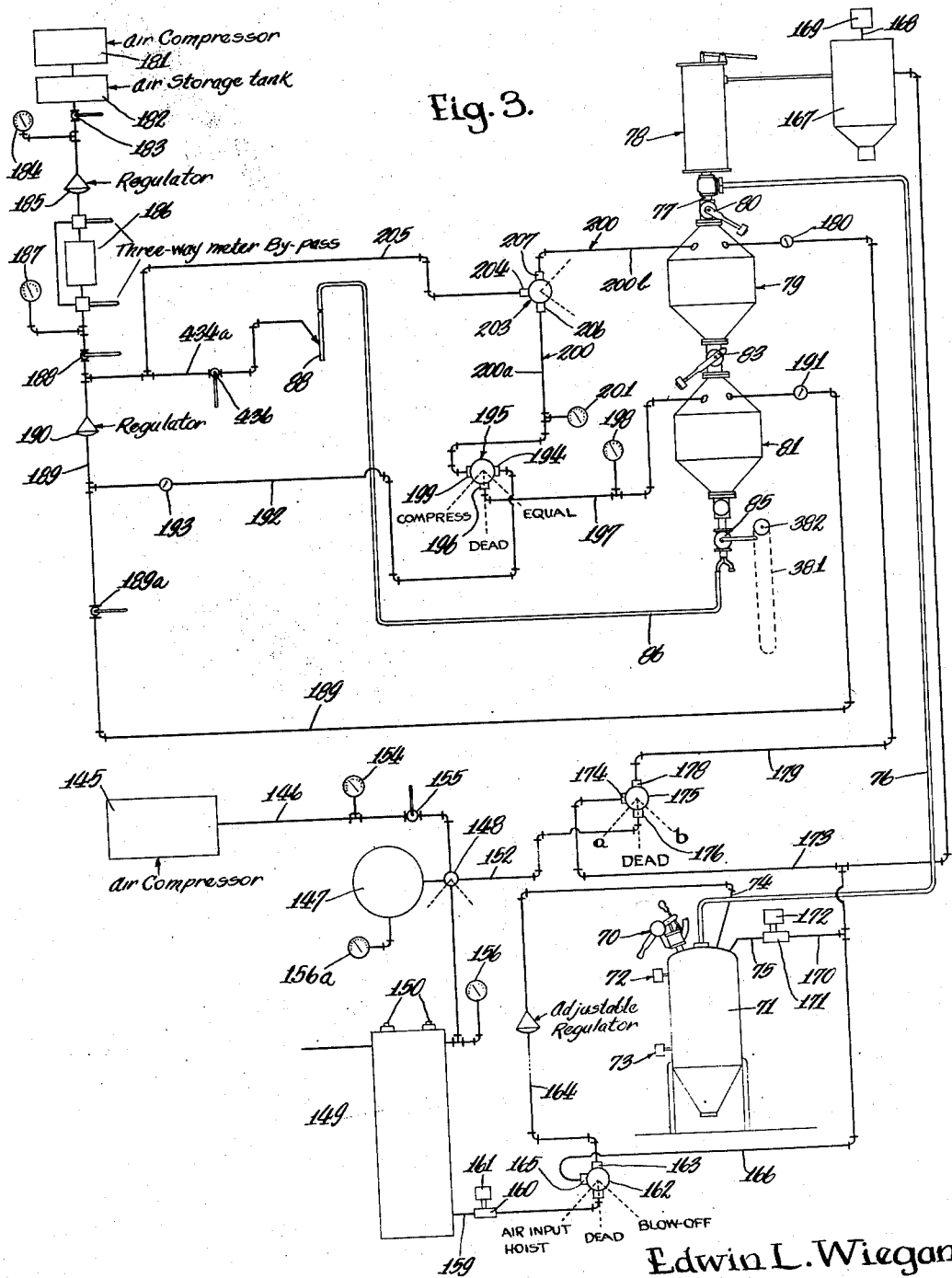

May 1, 1945. E. L. WIEGAND 2,375,057
CONVEYING SYSTEM
Filed Dec. 7, 1939 6 Sheets-Sheet 3

Edwin L. Wiegand
INVENTOR
BY Freeman, Sweet, Albrecht and Wiedman
ATTORNEYS

May 1, 1945.  E. L. WIEGAND  2,375,057
CONVEYING SYSTEM
Filed Dec. 7, 1939   6 Sheets-Sheet 4
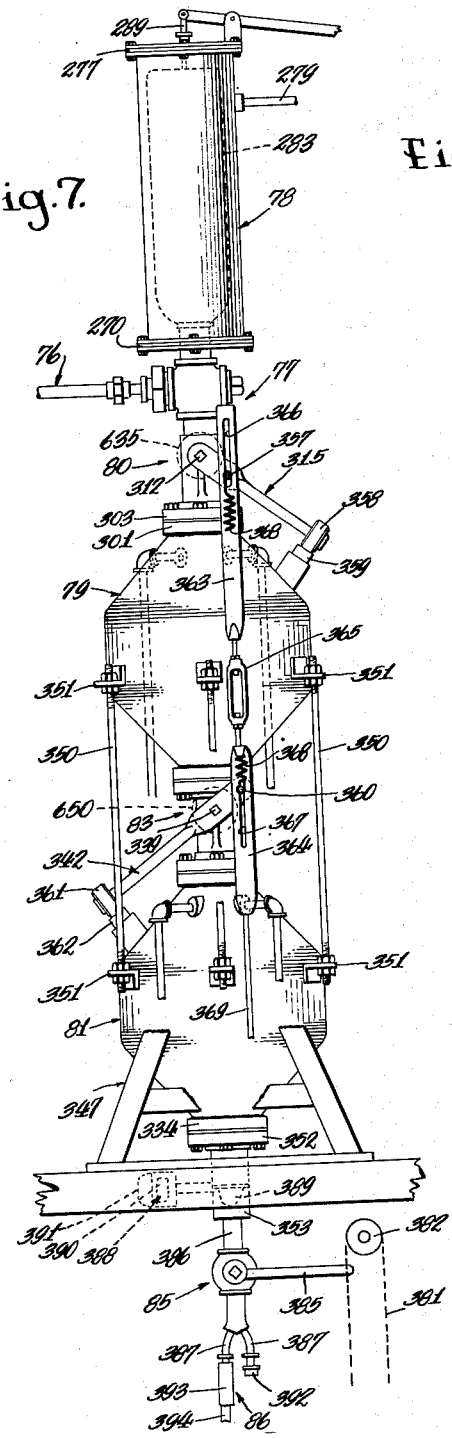
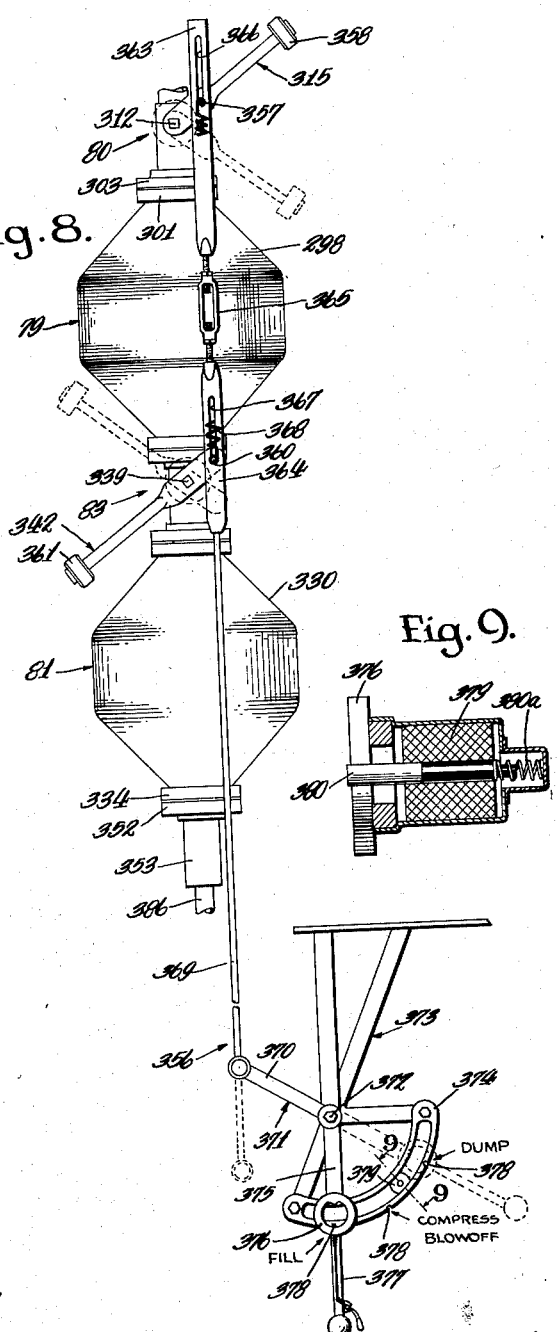
Fig. 7.  Fig. 8.  Fig. 9.
Edwin L. Wiegand
INVENTOR
BY
ATTORNEYS

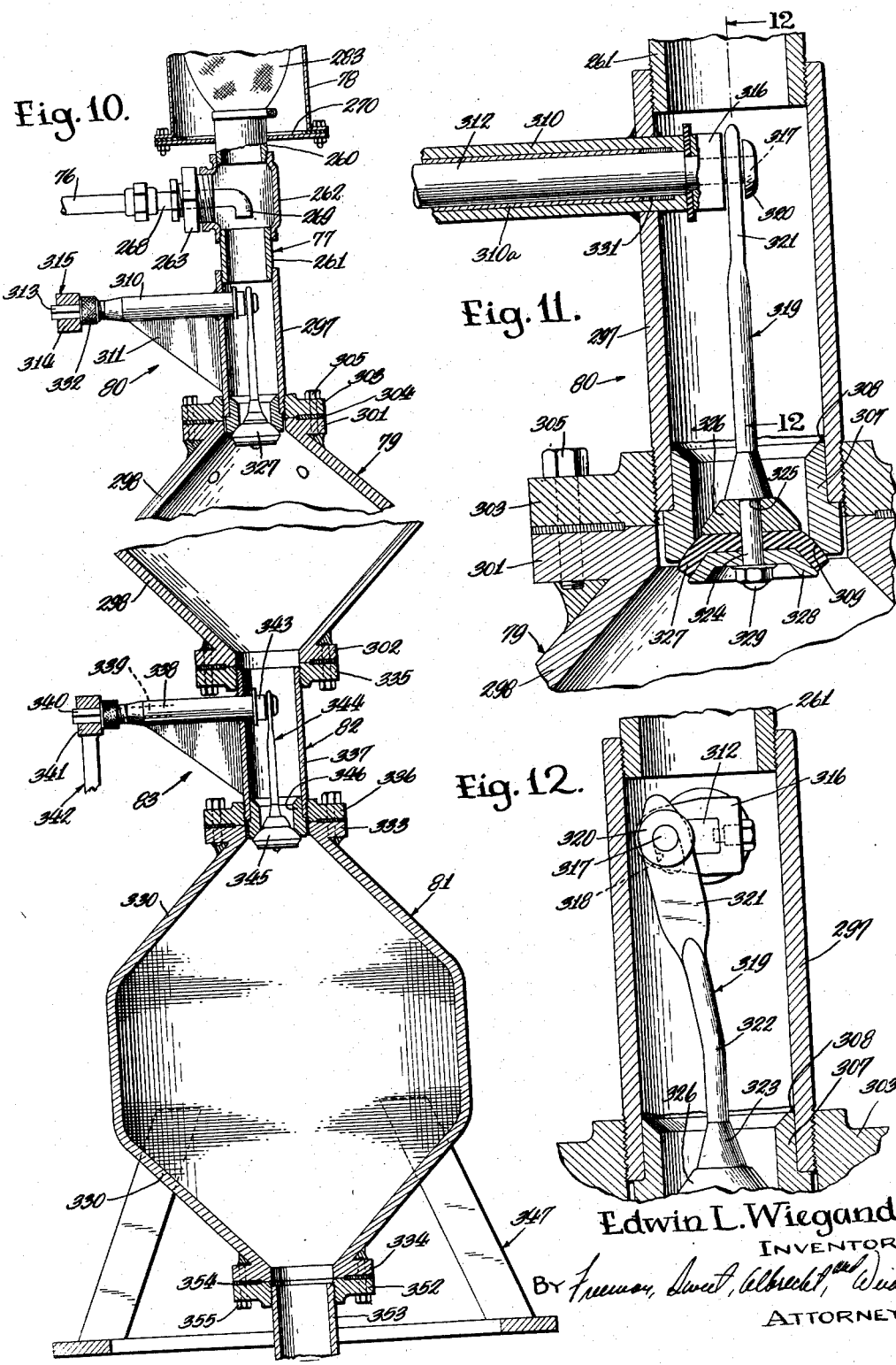

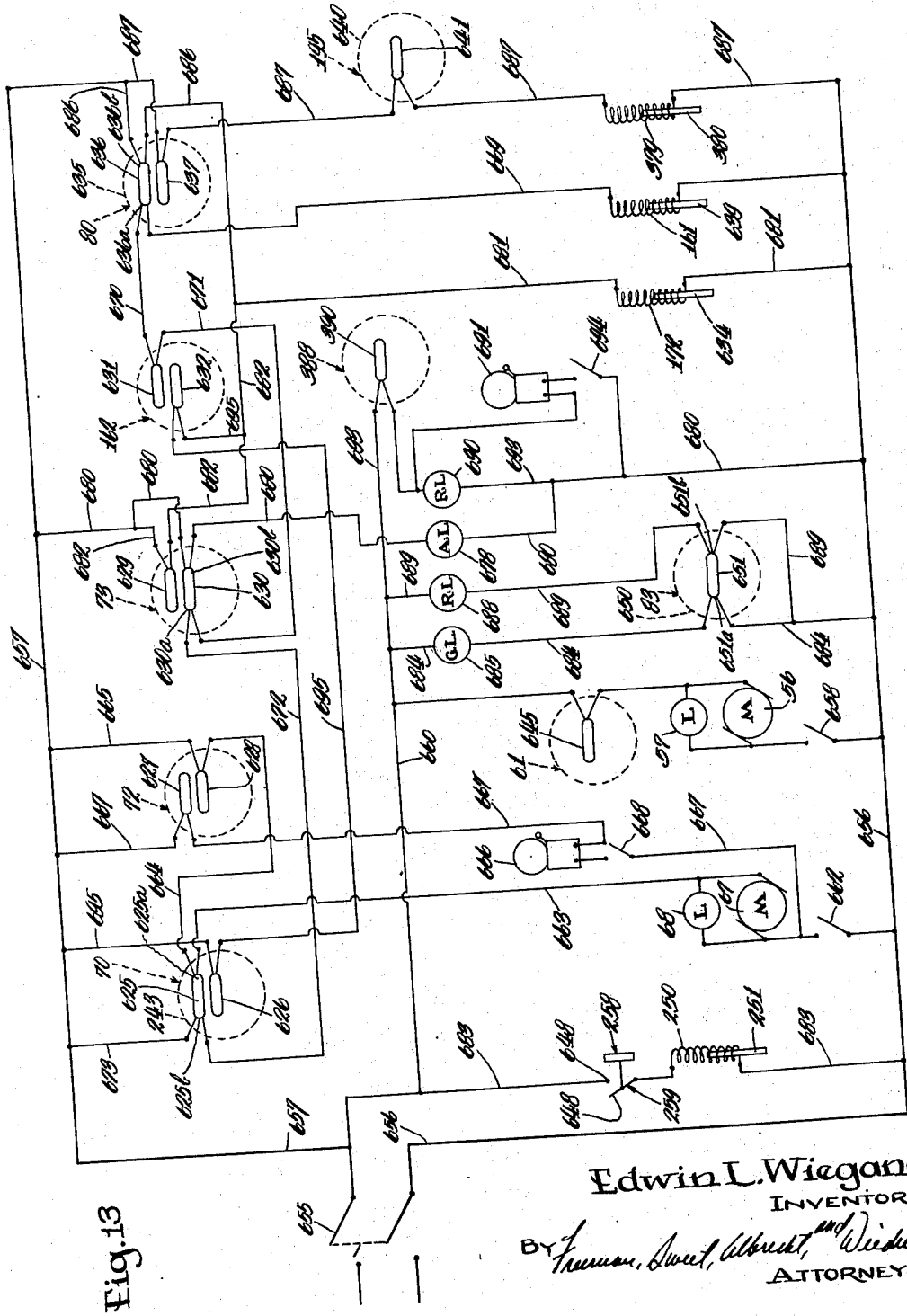

Patented May 1, 1945

2,375,057

UNITED STATES PATENT OFFICE 2,375,057

CONVEYING SYSTEM

Edwin L. Wiegand, Pittsburgh, Pa., assignor to Orefraction Incorporated, Pittsburgh, Pa., a corporation of Pennsylvania Application December 7, 1939, Serial No. 308,002

4 Claims. (Cl. 302—17)

My invention relates to the processing of materials, and more particularly, the conveying of materials involved in a system for the grinding of materials, and the separation of co-mingled material particles. The principal object of the invention is the improvement of apparatus for carrying out such processing of materials particularly the conveyance of such materials from one tank to another by pneumatic means.

Figure 5:
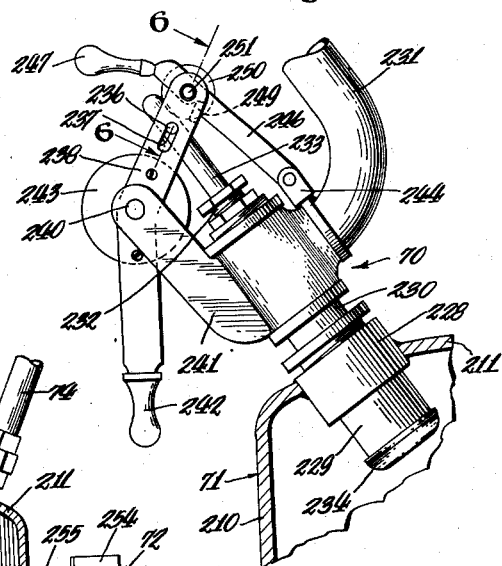
Figure 4:
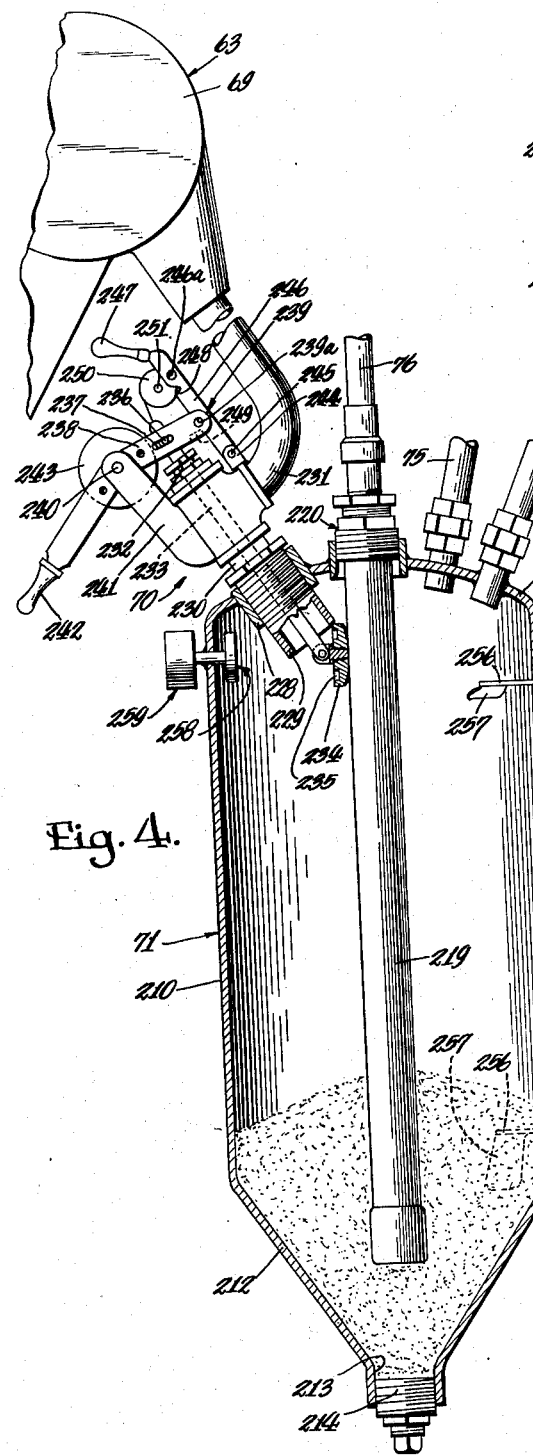
Figure 6:
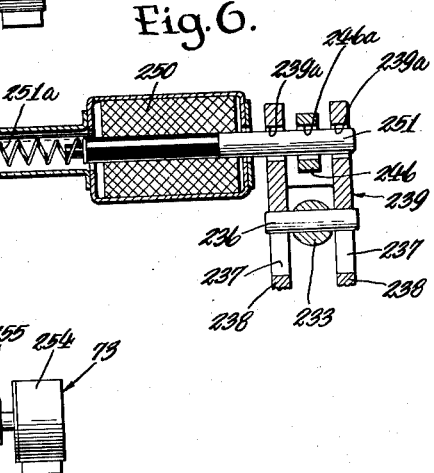

In the drawings accompanying this specification and forming a part of this application, there is shown, for purposes of illustration, one embodiment of apparatus embodying the invention, and in these drawings:

Figure 1 is a more or less diagrammatic view of the relation between material conveying means, grinding means, and separating means, as these means may be utilized in one embodiment of my invention, Figure 2 is a sectional view of a material hopper and control device, Figure 3 is a more or less diagrammatic view, particularly showing the fluid connections between parts of the apparatus, Figure 4 is an enlarged sectional view of the solids metering and hoist tank, parts being shown in elevation, and parts being broken away, this view showing a solids inlet valve for the tank in open position, Figure 5 is a fragmentary detail view showing the solids inlet valve in closed position, Figure 6 is a section taken on the line 6—6 of Figure 5, looking in the direction of the arrows, Figure 7 is an elevational view showing the relationship between an air strainer tank and upper and lower material feed tanks, and showing also valves in the connections in a certain position, Figure 8 is a view similar to Figure 7, omitting the air strainer tank and certain other parts, and showing the valves in full lines in a different position, and in dotted lines in still another position, and including the means for actuating the valves, Figure 9 is a section taken on the line 9—9 of Figure 8, Figure 10 is an enlarged fragmentary sectional view through the upper and lower material feed tanks, Figure 11 is an enlarged sectional view through one of the valves shown in Figure 10, Figure 12 is a sectional view corresponding generally to the line 12—12 of Figure 11, parts being shown in elevation, and Figure 13 is an electrical diagram, showing the electrical connections between parts comprised in the apparatus.

The term "material" is used herein to include any substance of a divided nature, as distinguished from relatively large blocks of substances. The term "grinding" is used herein in its broader aspects as meaning reduction in size, in any way, of the material being treated, and in its more specific aspects, such "grinding" as occurs when material is subjected to impact. Examples of material which may be ground by an apparatus embodying my invention are such materials as zircon, rutile, quartz, feldspar, fluorspar, marble, glass, enameling frit, hard metals, artificial or other abrasives, industrial diamonds, and many others either of similar or different characteristics. My invention is particularly adapted to reduce hard, tough, and abrasive materials, including ores having these characteristics. Also it is particularly adapted to grind material to ultra-fine sizes, such as for example —200 mesh to micron sizes. Preferably the material to be ground should not be larger than 16 to 18 mesh size, although it is possible to accommodate larger sizes. In general the sizes to be commenced with may be any desirable size which cannot be better or more economically crushed otherwise, but the size of the material to be ground is related to gun size, and therefore also to the capacity of the apparatus. However, the capacity of apparatus embodying my invention is very great in relation to the gun bore area, as fully appears in my copending divisional application Serial No. 362,563.

Referring to the schematic arrangement shown in Figure 1, the embodiment of the invention there illustrated comprises a container 50 adapted to contain material to be ground, and hereafter referred to as the new-materials container. The new-materials container 50 may be formed with an outlet spout 51 discharging into a funnel 52 carried by the receiving end 53 of an elevating device 54, such as the bucket elevator here shown. A suitable slide valve 55 is interposed in the outlet spout 51 to regulate the flow of material from the new-materials container 50 to the receiving end 53 of the elevator 54. The elevator 54 may be driven by means of an electric motor 56, and may also have a signal device, such as the electric light 57, to indicate when the elevator 54 is operating. The discharge end 58 of the elevator 54 discharges into a conduit 59 leading to a blending and metering hopper 60, desirably provided with an inclined false bottom 60a, and having high and low limit controls 61 and 62, so as to control operation of the motor 56 of the elevator 54, the connections being such that the motor 56 of the elevator 54 is automatically started when the level of the material falls below the low level device 62, and the motor 56 is automatically stopped when the material rises up to the high level device 61.

Preferably, the high level control 61 comprises a rotatable housing disposed at the outside of the hopper, the housing containing a mercury switch which is electrically connected to the motor 56, the housing being rotatable in one direction by a vane 61a within the hopper 60 (see Figure 2). The low level device 62 comprises a pivoted vane 62a, within the hopper 60, urged counterclockwise, as viewed in Figure 2, by a counterweight 62b. The vanes 61a and 62a are shown in Figure 2 in the position they occupy when the hopper 60 is full of material, as indicated by the upper dotted mound line M, the vane 61a standing about 45° counterclockwise to the right of the vertical and the vane 62a about 45° clockwise to the left of the vertical. The vanes 61a and 62a are shown as connected by a lost motion connection which includes a rod 62c disposed at the outside of the hopper 60, pivoted at its lower end to a crank 62d movable in unison with the vane 62a, and having at its upper end a slot with which cooperates a pin on a crank 62e movable in unison with the vane 61a.

Withdrawal of the material from the hopper 60 causes the surface of the mound of material to fall, but for the time being the vane 61a, by friction adjustment of its shaft, remains in the position shown in Figure 2, even though the surface of the mound adjacent the vane 61a recedes away from that vane. When the mound of material decreases in height so that its surface adjacent the vane 62a recedes sufficiently away from that vane, the counterweight 62b causes counterclockwise rotation of the vane to a position about 45° counterclockwise to the right of the vertical, such movement being transmitted through the lost motion connection so as to move the vane 61a clockwise to a position about 45° to the left of the vertical, thus moving the mercury switch to its "on" position, in which position it completes the circuit through the motor 56, whereby material is delivered to the hopper 60 by the elevator 54.

When the mound of material in the hopper increases, either by reason of delivery by the elevator 54 or otherwise, as will appear hereinafter, the material acts against the vane 62a and eventually moves the vane 62a clockwise, into the position shown in Figure 2, against the urging action of the counterweight, when the mound reaches the height indicated by the lower dotted mound line m. However, such movement of the vane 62a will not affect the vane 61a because of the lost motion connection therebetween. When the mound of material rises enough, the material will act against the vane 61a and eventually move it counterclockwise to the position shown in Figure 2, when the mound has increased to the upper dotted mound line M, thereby causing rotation of the mercury switch to its "off" position, and thus interrupting the circuit of the motor 56.

Positioned alongside of the hopper 60 is a second elevator 63, having its inlet end 64 receiving material from the lower end of the hopper 60, as by means of a conduit 65, a suitable slide valve 66 being so interposed as to control the amount of material flowing from the hopper 60. The elevator 63 is driven by an electric motor 67, and may have a signaling device, such as the electric light 68, to indicate when the motor 67 is running.

The discharge end 69 of the elevator 63 leads to the inlet of a solids valve 70 the outlet of which communicates with the interior of a charge metering and hoist tank 71. The hoist tank 71 has high and low level devices 72 and 73 respective, so related to other parts (as will more fully appear) as to permit the motor 67 to operate when the material is below the low level device 73, and to interrupt the circuit of the motor 67 when the material reaches the high level device 72.

A fluid under pressure, in the present instance, air, may be admitted to the hoist tank 71 through a conduit 74, and such air may be released from the hoist tank 71 through either the conduit 74 or a blow-off conduit 75. With material in the hoist tank 71, and air under pressure supplied to the hoist tank 71 through the air conduit 74, the material in the hoist tank 71 is forced to move through a conduit 76 to a connection conduit 77 between an air strainer tank 78 and an upper material feed tank 79, a valve 80 being interposed in the connection conduit 77 to permit admission of material to the upper tank 79 and to enable the tank to be placed under fluid pressure. Assuming the valve 80 to be in open position, the material which passes through the conduit 76 is delivered to the connection conduit 77, the air used for hoisting purposes being strained by and vented from the strainer tank 78, and the material dropping into the upper feed tank 79.

The upper feed tank 79 is connected to a lower feed tank 81 by means of a connection conduit 82, a valve 83 being interposed in the connection conduit 82 to permit transfer of material from the upper tank 79 to the lower tank 81, and to enable the lower tank to be maintained under pressure. The lower tank 81 has an outlet conduit 84, a valve 85 being interposed in the outlet conduit 84 for permitting or interrupting the outflow of material from the lower tank 81. Means, shown in Figure 3, is provided for admitting air under pressure to the upper and lower tanks 79 and 81, as will more fully appear.

Assuming that the valve 83 is closed and the valve 85 is open, and assuming also that material is in the lower tank 81, and that this tank is under air pressure, the material from the tank 81 will be forced through the outlet conduit 84, and through a hose conduit 86 to the breech 87 of a gun 88, and through this gun 88 to the grinder case 89, the ground material passing through a conduit 90 to a first separating device 91 of the cyclone type. The heavier material in the first separating device 91 may gravitate past a check valve 92 used to build up a "head" of material at the discharge end of the first separating tank 91, through a conduit 93 to a funnel 94, and from the funnel 94 to a screen chamber 95 of a screening device 96. The screening device 96 may be of the vibrating type, having a screen 97 over which the material is shucked, the screen having a certain predetermined mesh size, as for example 200 mesh.

The material which passes through the screen 97 falls into a hopper 98, the outlet of the hopper 98 having a bagging device 99, to which a bag 100 is attached, the bag 100 receiving such material for shipment if desired. For convenience, the bag 100 may be disposed on a platform 101 of a scale 102, so that the amount of material delivered to the bag 100 may be weighed as it is delivered to the bag. That material which does not pass through the screen 97 is discharged from the screen chamber 95 through a conduit 103, and back to the mixing hopper 60. Additional material, from the new materials container 50, may be added to the hopper 60 by means of the elevator 54, the high level device 61 limiting the amount of new material delivered to the hopper 60. In this manner the material removed from the system is automatically replaced with new material from the new materials container 50. The slide valve 55 may be adjusted to a particular flow rate, such rate being determined by the rate at which finished material is removed from the system.

Additional separating means is provided for additionally separating that material which does not gravitate from the first separating device 91, and this means comprises, among other parts, a pump, in this instance a blower fan 104, disposed within a fan chamber 105 and driven by an electric motor 106. The outlet of the fan chamber 105 is branched, one branch 107 leading to the atmosphere, and the other branch 108 being connected to one end of a conduit 109, the opposite end 110 of the conduit 109 leading tangentially into the first separating device 91, if desired in two diametrically disposed tangential branches 110a and 110b. Slide valves 111 and 112 are respectively interposed in the branch conduits 107 and 108, these valves being independently adjustable so as to regulate the amount of air discharged by the blower through the respective branch, for a purpose to appear.

The upper discharge outlet of the separating device 91 is connected to the inlet of the blower chamber 105, and in this instance certain devices are interposed in this connection. Extending from the upper discharge outlet of the first separating device 91 is a separating column 113, of any suitable cross-sectional form, area, and length, which extends vertically and is connected to a conduit 114 which is tangentially connected to the upper end of a second air separating device 116. Desirably the separating column 113 is enlarged with respect to the conduit 114, and may taper toward its lower end to cause hindered settling. The device 116 may be of the cyclone type, comprising a chamber having an upper cylindrical portion 117 and a downwardly tapering conical portion 118. A bagging device 119 is connected to the lower end of the conical portion 118, and has attached thereto a bag 120 for receiving material gravitating downwardly of the conical portion 118. The upper end of the second separating device 116 is formed with a housing 121 communicating with the interior of the device 116. The housing 121 communicates by means of a conduit 122 with a dust collector or separator 123, which may be of any suitable type. The lower end of the dust separator 123 has attached thereto a bagging device 124, and the air outlet of the dust separator 123 is connected by a conduit 125 to the inlet of the fan chamber 105.

Assuming that the motor 106 is operating, and that the valve 111 is at least partially open, and that ground material, along with air used in grinding it, is being delivered through the conduit 90 to the first separating device 91, the material which under the air conditions prevailing in the separating system is not heavy enough to gravitate at once from the separating device 91, will be picked up by the stream of air in the column 113. Some of this material will continue to be carried by that stream to the top of the column 113 and through the conduit 114 to the upper end of the second separating device 116, and will be caused to swirl in this upper end because of the tangential connection of the conduit 114. The heavier materials in the second separating device 116 will gravitate downwardly through the conical portion 118, and will be delivered to the bag 120 through the bagging device 119. The lighter material will be carried upwardly by the air stream through the housing 121 and the conduit 122, to the dust collector 123, where the dust will be separated from the air, the dust particles being discharged from the bottom of the dust separator 123 and to the bagging device 124, and the air passing to the conduit 125 and back to the inlet of the blower chamber 105. Some of the material which enters the separating column 113 from the separating device 91 does not continue with the upwardly moving stream of air into the conduit 114, but gravitates back through the stream into the separating device 91 and finally reaches the lower or discharge end of the separating device 91, and thus the separating action of the system is improved.

Depending upon the setting of the slide valves 111 and 112, either an under-pressure or an over-pressure condition (with respect to atmospheric pressure) can be made to exist in the first separating device 91. Usually the valve 112 is partially or completely closed, and the valve 111 partially or completely open, so that an under-pressure or partial vacuum exists within the first separating device 91 and in the column 113, whereby material readily passes from the grinder case 89 to the first separating device 91, and no back pressure is created in the conduit 90 leading from the grinder case 89. Also, usually the valves 111 and 112 are adjusted to effect substantially zero (atmospheric) pressure in the grinder case 89, thereby to avoid back pressure in the grinder case 89 that might interfere with the operation of the grinder gun. However, it will be apparent that the pressure conditions in the grinder case and in the separating system can be regulated by adjustment of the slide valves 111 and 112 to obtain any desired pressure conditions. Furthermore, the velocity of the upwardly moving stream of air in the separating column 113 may be adjusted to a most suitable velocity so that the separating function of the column 113 will be optimum.

The first separating device 91 may be moved from the position shown in full lines in Figure 1 to the position shown in dotted lines, wherein its lower end no longer communicates with the conduit 93, but instead communicates with a conduit 135 leading to a tank 136, hereinafter referred to as a by-pass tank. The lower end of the tank 136 carries a bagging device 137, to which a bag 138 may be attached, and a check valve 139 is interposed in the conduit 135. In this position of the device 91 the ground material, excepting only a controllable amount and size of very fine material, instead of going to the screen chamber 95, passes directly to the by-pass tank 136. The conduit 113 in this position may still be connected to the conduit 114. The by-pass tank connection is particularly useful when it is desired to make an unscreened ground aggregate, with only a minimum of extreme fines removed.

The fluid pressure system is particularly shown in Figure 3, and in this embodiment uses air as the fluid, although any other suitable fluid may be used. The system comprises an air compressor 145, a conduit 146 leading from the air compressor 145 to an air storage tank 147, and a three-way valve 148 interposed in the conduit 146, the valve 148 in one position establishing communication between the compressor 145 and the storage tank 147, and in another position establishing communication between the storage tank 147 and a tank 149, hereinafter referred to as the waste air tank, the latter tank having safety valves 150 adapted to open at a predetermined pressure, as for example 175 to 185 pounds per square inch.

To start the apparatus initially, the valve 148 is set to establish communication between the air compressor 145 and the storage tank 147, and any desired pressure is built up in the tank 147. The valve 148 is then turned to establish communication between the storage tank 147 and the waste air tank 149, and air is permitted to flow to the tank 149 until the predetermined pressure is built up in the tank 149. The valve 148 is then turned to its third position, wherein it establishes communication between the waste air tank 149 and a conduit 152, for a purpose hereinafter explained. A manual control valve 155 may also be interposed in the conduit 146 for controlling the flow of air through the conduit 146, and a pressure indicator 154 may be connected to the conduit 146 ahead of the valve 155. Pressure indicators 156 and 156a may be connected to the waste air tank 149 and to the storage tank 147 respectively.

Leading from the waste air tank 149 is a conduit 159, a valve 160 being interposed in this conduit to permit or interrupt flow of air therethrough, the valve 160 being actuated by means of a solenoid 161. The conduit 159 leads to a manually operable valve 162, preferably of the three-way packed plug cock type, one outlet 163 of the valve 162 leading by means of a conduit 164 to the inlet conduit 74 of the hoist tank 71, and the other outlet 165 leading by means of the conduit 166 to a dust separator 167. The dust separator 167 has an air outlet 168 leading to a muffler 169 for the purpose of muffling the noise of the escaping air, the air passing from the muffler 169 to the atmosphere.

The blow-off conduit 75 of the hoist tank 71 is connected to a conduit 170 through a valve 171 interposed to permit or interrupt the flow of air through the conduits 75 and 170, the valve 171 being actuated by a solenoid 172. The conduit 170 is connected with the conduit 166, and through the conduit 166 with a conduit 173 which leads to one outlet 174 of a manually operable valve 175 which may be of the three-way type in all respects similar to the valve 162. Another outlet 176 of the valve 175 is connected by means of the conduit 152 to the three-way valve 148, while the third outlet 178 is connected by means of a conduit 179 to the upper tank 79, a check valve 180 being interposed in the conduit 179 to permit air to flow only outwardly of the upper tank 79 and to prevent reverse flow.

The present embodiment provides a separate air compressor 181 for supplying air under pressure to the upper and lower tanks 79 and 81. The compressor 181 is connected to a storage tank 182 by a suitable conduit as shown. Extending from the storage tank 182 to the lower tank 81 is a conduit 189 in which are interposed a line cock 183, a line gauge 184, a pressure regulator 185, a three-way meter by-pass 186, another line gauge 187, a stop cock 188, a stop cock 189a to permit and interrupt the flow of air to the tank 81, and a check valve 191 to permit air to flow only into the lower tank 81 and to prevent reverse flow. It will be apparent that the conduit 189 furnishes direct, regulated, and controllable pressure to the tank 81, so that material within the tank 81 will be positively forced out by this direct pressure through the conduit 86 and the gun 88.

A conduit 192 is tapped into the conduit 189 between the regulator 190 and the stop cock 189a, and has a check valve 193 interposed therein to permit air to pass only from the conduit 189 through the conduit 192 and to prevent air from passing from the conduit 192 back to the conduit 189. The conduit 192 is connected to one port 194 of a manually operable valve 195, which may be of the three-way type similar to the valves 162 and 175, a second port 196 of the valve 195 being connected by means of a conduit 197 to the lower tank 81, a pressure indicating device 198 being connected to the conduit 197. The other port 199 of the valve 195 is connected by means of a conduit 200 to the upper tank 79, and a pressure indicating device 201 may be connected to this conduit 200.

Describing generally the pressure system, it will be assumed that material is in the hoist tank 71, but that no material is in the upper and lower feed tanks 79 and 81, and it will also be assumed that the valve 80 in the upper tank is open, and that the valve 83 between the upper and lower tanks 79 and 81, and the valve 85 below the lower tank 81, are closed. The control lever of the valve 162 is turned to the position marked "air input, hoist," so as to permit air under pressure from the waste air tank 149 to flow through the conduit 159, the valve 160 (assuming that this valve is open), the conduits 164 and 74, to the hoist tank 71, and after a predetermined amount of pressure has been built up within the hoist tank 71, the material will be forced through the conduit 76 to the connection conduit 77, and into the upper tank 79. The pressure required to move the material in the hoist tank 71 depends upon the characteristics of the material and the speed at which it is desired to move such material. The air used to move the material to the upper tank 79 is filtered by passage through the air strainer tank 78 and escapes therefrom. After all of the material has been hoisted to the upper tank 79, the operator may turn the control lever of the valve 162 from the "air input, hoist" position to the "blow-off" position, so that the pressure within the tank 71 may be relieved by air flow through the conduit 164, the port 165 of the valve 162, the conduit 166, the dust separator tank 167, the muffler 169, and to atmosphere, or the pressure may be relieved otherwise as will appear hereinafter.

During operation of the apparatus, air under pressure is delivered directly to the lower tank 81 by means of the conduit 189. Assuming that the material in the lower tank is low, and that material already has been hoisted to the upper tank 79 in a manner hereinbefore described, and that the valves 80, 83, and 85, are closed, the control lever of the three-way valve 195 is turned to "compress" position, and in this position of the valve 195 air from the conduit 192 passes through the valve 195 and through the conduit 200 to the upper tank 79, and air is thus admitted until the pressure indicator 201 shows that the pressure in the upper tank 79 is substantially equal to that in the lower tank 81. The control lever of the valve 195 is then moved to "equalize" position, whereupon the conduit 192 is shut off, and communication between the tanks 79 and 81 is established by means of the conduit 197, the valve 195, and the conduit 200, so as to insure that the pressure within the lower tank 81 is not greater than that in the upper tank 79. Then the valve 83 is opened to permit the material from the tank 79 to pass to the tank 81. The control lever of the valve 195 may then be moved to "dead" position.

If desired, air under a pressure higher than that within the tanks 79 and 81 may be introduced into the upper tank 79 so as to force the material from the tank 79 into the lower tank 81. To provide for such higher pressure air, a three-way valve 203 may be interposed in the conduit 200, one port 204 of the valve 203 being connected to a conduit 205 tapped into the pressure line 189 ahead of the pressure regulator 190 to receive a higher pressure than exists in the part of the conduit 189 downstream of the regulator. The other ports 206 and 207 of the valve 203 are interposed in the conduit 200. Thus with the valve 203 in position to establish communication between the conduit 205 and the part 200b of the conduit 200, and to cut off communication with the part 200a of the conduit 200, the air under higher pressure in the upper tank 79 will surge to the lower tank 81, and will forcibly remove any remaining material from the tank 79.

When all the material has been delivered to the lower tank 81, the valve 83 is moved to closed position, and the valve 85 is opened, thus feeding material to the gun 88. To release the pressure in the upper tank 79, the control lever of the valve 175 is moved to a position indicated by the letter a, in which position the air from the upper tank 79 is permitted to move through the conduit 179, the valve 175, the conduit 152, through the valve 148, and to the waste air tank 149, the operator being notified when the maximum pressure in the waste air tank 149 has been reached, either by a signal device, or by the blowing off of the safety valves 150. At this point the operator may move the control lever of the valve 175 to the position indicated by the letter b, so that the remainder of the air under pressure from the upper tank 79 may flow through the conduit 179, the valve 175, the conduit 173, to the dust separator 167, through the muffler 169, and to the atmosphere. After all the air under pressure has been removed from the upper tank 79, the control lever of the valve 175 may be returned to its "dead" position. The valve 80 may then be opened, and material may again be hoisted from the hoist tank 71 to the upper tank 79.

Referring to Figure 4, the hoist tank 71 comprises a cylindrical body 210 having an integral dome-shaped top 211 and a downwardly tapering bottom 212, the extremity of the bottom 212 being provided with a clean-out opening 213 which is closed by a plug 214, and extending centrally of the tank 71 is an elongated preferably metallic tube 219 open at its lower end and screw-threaded at its upper end and received within a coupling 220 secured to the top 211 of the tank 71. The tube 219 is desirably provided with a rubber lining.

The solids inlet valve 70 is carried by the top 211 of the tank 71, the top 211 having an interiorly screw-threaded tube portion 228 secured thereto, as by welding, the tube portion 228 screw-threadedly receiving a tubular part 229 which in turn screw-threadedly receives a nipple 230 forming part of the valve casing, the construction being such that the axis of the valve 70 is at an angle to and intersects the axis of the elongated tube 219. The valve 70 has an inlet port 231 communicating with the discharge end 69 of the elevator 63, and also has a bearing 232 for a valve plunger 233. Pivoted to the lower end of the valve plunger 233 is a cap-form valve body 234 formed with an annular recess 235 arranged with a gasketed seat to close the inner extremity of the tube part 229 when the valve body is in closing position, as best seen in Figure 5.

The upper outer extremity of the valve plunger 233 is provided with a transversely disposed pin 236 engageable with the defining margins of slots 237 formed in respective arms 238 of a bifurcated operating lever 239, the lever being pivoted on a pin 240 carried by arms 241 extending from the casing of the valve 70. The lever 239 is operable by a handle portion 242. Rotatable with the lever 239 is the casing 243 of a mercury switch. The casing of the valve 70 is also provided with a pair of ears 244, carrying a pivot 245 for a swingable latching lever 246, the lever having an operating handle 247 and also having a notch 248 for receiving a tooth or detent 249 carried between the arms 238. As shown in Figure 5, with the valve 70 in closed position, the detent 249 fits into the notch 248 of the lever 246, and prevents opening movement of the valve 70. The valve 70 may be opened by manually engaging the operating handle 247 and moving the latching lever 246 so as to disengage the detent 249, movement of the lever 239 causing the detent 249 to ride on the adjacent marginal surface of the lever 246.

Means may be provided for locking the latching lever 246, as a solenoid 250 having a core 251 adapted to fit slidably in apertures 246a and 239a formed respectively in the latching lever 246 and the lever 239, the apertures being alined when the latching lever prevents movement of the lever 239, as shown in Figures 5 and 6. The solenoid core 251 is biased to the locking position, shown most clearly in Figure 6, as by a spring 251a, and the construction and arrangement is such that when the solenoid 250 is energized the core 251 will be drawn into the solenoid, against the bias of the spring 251a, thereby withdrawing the core 251 from the apertures 246a and 239a and releasing the levers 246 and 239 for desired manual movement.

Referring to Figure 4, it will be noted that when the valve plunger 233 is moved to open position, the valve-body 234 will engage the elongated tube 219 and cause the valve-body to pivot about the valve plunger 233 to its open position as shown.

The air inlet conduit 74, and the air blow-off conduit 75, may be suitably coupled to spuds secured to the top wall 211 to the tank 71. The tube 219 is suitably connected to and in communication with the conduit 76 preferably of rubber or rubber lined, and if desired the conduit 76, or the rubber lining thereof, may be continuous with the lining of the tube 219.

The high level and low level responsive devices 72 and 73 respectively comprise housings 254 rigidly carried by the tank 71, as by means of plugs 255 threaded into collars carried by the cylindrical portion 210 of the tank 71. Rotatable within each of the plugs 255 is a shaft 256 carrying a vane 257, the vanes being each suitably biased to a generally horizontal position as shown by the vane on the high level indicating device 72, and being moved to a generally vertical position, as shown by the vane of the low level device 73, by the material within the tank 71, movement of the shafts causing operation of switch means within the respective housings 254, as will more fully appear. As shown in Figure 4, the tank 71 also carries a pressure responsive device 258, responsive to pressure within the tank, and constructed and arranged to actuate a switch 259 connected thereto for a purpose to be set forth.

The connection conduit 77, as best shown in Figure 10, comprises stub portions 260 and 261, respectively connected to the air strainer tank 78 and the upper tank 79, the stub portions 260 and 261 being connected to oppositely disposed branches of a three-way fitting 262, the other branch of the fitting 262 having therein a bushing or gland 263 through which is disposed a tube 268 the outer end of which is coupled to the conduit 76 and the inner end of which is formed with a downwardly curved spout 269 directed toward the stub portion 261 of the conduit 77.

The air strainer tank 78 is supported from the connection conduit 77, as best shown in Figure 10, the portion 260 passing through and being suitably fastened to a bottom closure plate 270 for the tank 78. As can be seen in Figures 3 and 7, the strainer tank 78 has a top closure plate 277, and a conduit 279 establishes communication between the interior of the tank 78 and the interior of the dust separator 167. The lower open end of a dust bag 283, such as a dust bag ordinarily used on a vacuum cleaner, is suitably connected to communicate with the conduit portion 260. Means may be provided for shaking the bag 283 so that it may be kept in condition to filter and to permit the escape of the air used to hoist the material to the upper feed tank 79, and for that purpose the present embodiment comprises a plunger 289 suitably passing through the top closure plate 277.

The stub portion 261 of the connection conduit 77 is screw-threadedly received within a tubular portion 297 (see Figure 10) forming part of the housing for the valve 80 associated with the upper feed tank 79. The upper tank 79 has its upper and lower portions 298 of conical form. The upper and lower ends of the tank 79 are open, and are surrounded by integral flanges 301 and 302 respectively. An annular flange 303 overlies the upper flange 301, a gasket 304 being interposed between the flanges, and bolts 305 pass through apertures in the flange 303 and are received within screw-threaded apertures formed in the flange 301. The flange 303 is formed with a central screw-threaded aperture for receiving the lower threaded end of the tube portion 297, and a valve-seat block 307 (see Figure 11) is fitted into the lower end of the tube portion 297, and desirably is welded to the tube portion 297, as shown at 308. Also the block 307 is formed with a valve seat 309, and extends partially into the upper open end of the upper tank 79.

Extending transversely from the upper end of the tube portion 297 is a bearing tube 310, a web 311 reinforcing the connection between the bearing tube 310 and the tube portion 297, and journaled within the bearing tube 310 is a valve operating shaft 312 having a squared outer end 313 for receiving one end 314 of a valve lever 315. The bearing tube 310 extends a slight distance within the tube portion 297, and the operating shaft 312 at this point is reduced in diameter and squared to fit into a squared opening formed in a crank 316, a set screw holding the crank 316 to the shaft 312. The crank 316 carries an off-center pin 317 (see Figures 11 and 12) fitting through a slot 318 formed in a flattened portion 321 of a rod 319, the pin 317 having a headed portion 320 holding the rod assembled on the pin 317. The rod 319 also has a portion 322 round in cross-section and slightly bent, as best shown in Figure 12, and the lower end of the rod 319 is formed with a conical enlarged portion 323 and with a reduced extremity 324 forming a shoulder 325 with the conical portion 323. A frustro-conical block 326, having a central aperture, is fitted on the reduced extremity 324, and a resilient valve body 327, preferably formed of rubber and having a generally frustro-conical outline, is fitted over the reduced extremity 324, and an inverted cup-shaped disk 328 is positioned to hold the valve member 327 in position, a nut 329 being screw-threaded on the end of the reduced extremity to hold the disk 328, the valve member 327, and the block 326, in position on the valve arm 319, the nut preferably being welded to the disk 328 as best shown in Figure 11.

The valve 80 is shown in closed position in Figures 10 through 12. Sufficient rotation of the shaft 312 in a direction to cause counter-clockwise movement of the crank 316, with reference to its position shown in Figure 12, will cause unseating of the valve body 327 from the valve seat 309. The slot 318 permits the valve body 327 to be pressed more firmly against the seat 309 by fluid pressure within the tank, and also permits the pin 317 to give a hammer blow to the lower end of the slot in opening the valve.

The bore of the bearing tube 310 may be enlarged so as to accommodate between it and the shaft 312 a tubular gland 310a forced against packing 331 by a gland nut 332 threaded on the outer end of the bearing tube 310. The enlarged part of the bore of the tube 310 extends to near the inner end of the tube 310 so that the packing 331 effectively prevents grit from getting between the journal surface of the shaft 312 and the co-operating bearing surface of the gland 310a.

The lower feed tank 81 is formed in all respects similar to the upper tank 79, having upper and lower conical portions 330, and also upper and lower flanges 333 and 334 respectively.

Underlying the lower flange 302 of the upper tank 79 is an annular flange 335 (see Figure 10) having a central screw-threaded aperture, and overlying the upper flange 333 of the lower tank 81 is an annular flange 336 also having a central screw-threaded aperture, and the connection conduit 82 between the upper tank 79 and the lower tank 81 comprises a tube portion 337 which extends between and has screw-threaded ends respectively received in the apertures formed in these flanges 335 and 336. The tube portion 337 forms part of the valve housing for the valve 83. Extending transversely from the upper end of the tube portion 337 is a bearing tube 338 in which is journaled a valve operating shaft 339 having a squared end 340 for receiving an intermediate portion 341 of a valve operating lever 342. The inner end of the valve shaft 339 is connected to a crank 343 in the same manner as the shaft 312 is connected to the crank 316. A rod 344, similar in all respects to the valve arm 319, is connected to the crank 343, and carries a resilient valve body 345 which cooperates with a valve-seat block 346, the parts 345 and 346 being similar to the parts 327 and 307 hereinbefore described. The valve shaft 339 may be packed in the same way as the shaft 312.

The air strainer tank 78, and the upper and lower feed tanks 79 and 81, may be at least in part carried by a frame structure 347, resting upon a suitable supporting surface. The upper and lower tanks 79 and 81 are further held rigidly connected by means of a plurality of connecting rods 350 (see Figure 7) extending between angle pieces 351 fastened to the respective tanks.

Referring particularly to Figures 7 and 8, the valves 80 and 83 are adapted to be moved in a predetermined order by operating means 356. The valve lever 315 has a pin 357 spaced from the valve shaft 312, and the extremity of the valve lever 315 is provided with a weight 358 arranged to urge the valve lever arm 315 to its valve-closing position shown in Figure 7. A resilient stopper block 359, desirably formed of rubber, is carried by the upper tank 79 in position to limit movement of the weight 358. The valve lever 342 has a pin 360 carried spaced from the valve shaft 339, the pin 360 being in longitudinal alinement with the pin 357 carried by the arm 315. The valve lever 342 carries a weight 361 arranged to urge the lever 342 to its valve-closing position shown in Figure 7, a resilient stopper block 362 being carried by the lower tank 81 in position to limit movement of the weight 361.

The operating means 356 further comprises a pair of longitudinally spaced-apart elongated metallic strips 363 and 364, the strips being adjustably connected by a turnbuckle arrangement 365. The strip 363 has an elongated slot 366 for receiving the pin 357 carried by the valve lever 315, while the strip 364 has an elongated slot 367 for receiving the pin 360 carried by the valve lever 342. A coil spring 368 has its ends connected respectively to the pins 357 and 360, the spring 368 additionally urging the valve levers 315 and 342 to their valve-closing position shown in Figure 7.

Connected to the lower end of the strip 364 is an elongated rod 369 having its lower end pivotally connected to one arm 370 of a bell crank lever 371. The lever 371 is pivoted at 372 to a supporting frame 373 carried from a suitable supporting surface. Also carried by the supporting frame 373 is a quadrant 374. The other arm 375 of the bell crank lever 371 is positioned to traverse the quadrant 374 and includes an indicating portion 376 and an operating arm 377. The quadrant 374 is provided with three notches 378 located on the quadrant at the positions marked with the legends "Fill," "Compress" or "Blow-off," and "Dump." The operating arm 377 has a manually releasable spring-pressed detent engageable within any one of the notches 378, to hold the arm 377 in any one of the positions. The quadrant 374 also carries a solenoid 379 having a core 380 which is adapted to be moved into the position shown in Figure 9 by a spring 380a when the solenoid is deenergized, so that when certain conditions exist, as will appear, the core will extend into the path of movement of the indicating device 376 to prevent the operating arm 377 from being moved to "dump" position.

With the operating lever 377 in the position shown in full lines in Figure 8, that is, in the "fill" position, the valve levers 315 and 342 are in the position shown in full lines in Figure 8, and the valve 80 is open and the valve 83 is closed, thus permitting material to be delivered to the upper feed tank 79, while at the same time permitting the maintenance of an operating pressure within the lower tank 81. It will be noted that the slots 366 and 367 respectively formed in the strips 363 and 364 are so proportioned that the weight 361 may maintain the valve 83 in its closed position, while the weight 358 is lifted to provide opening of the valve 80. When the operating lever 377 is moved to the "compress" or "blow-off" position, the valve levers 315 and 342 are in the position shown in Figure 7, in which position the valves 80 and 83 are closed, thus permitting fluid under pressure to be admitted to the upper tank 79, while still permitting normal operation of the lower tank 81. When the operating lever 377 is moved to "dump" position, that is, the dotted line position shown in Figure 8, the valve levers 315 and 342 are moved to the position shown in dotted lines in Figure 8, in which position the valve 80 is closed but the valve 83 is open, the valves standing in these relations when the pressures in the tanks 79 and 81 have been equalized, so that material from the upper tank 79 may pass to the lower tank 81.

During initial charging, it is preferable to close the valve 85 at the outlet of the tank 81, movement of the valve 85 being effected by a chain 381 movable about a pulley 382, the chain being connected to a lever 385 connected to the plug of the valve 85. The chain preferably has its operating end positioned adjacent the operating arm 377.

Underlying the lower flange 334 of the lower tank 81 is an annular flange 352 having a central screw-threaded aperture receiving a tube portion 353. A suitable gasket 354 is interposed between the flanges 334 and 352, and bolts 355 hold the flanges 334 and 352 in assembled relation. The valve 85 is interposed in a conduit 386 which has its upper end connected to the tube portion 353. The conduit 386 is reduced in diameter with respect to the tube portion 353, and the free end of the conduit 386 is provided with a pair of nipples 387. A control device 388 is positioned adjacent the tube portion 353, to indicate when a low level in the lower tank 81 has been reached, the device 388 comprising a pivoted vane 389 disposed within the tube portion 353, a shaft carrying the vane being rotatable with the vane and being adapted to actuate mercury switch means 390 disposed within a housing 391. When the level in the lower tank 81 falls below the level of the vane shaft, the vane moves upwardly, thus causing desired actuation of the mercury switch 390.

In the embodiment shown (see Figure 7), one of the nipples 387 of the conduit 386 is closed by means of a cap closure 392, while the other nipple 387 has securely clamped thereto one end of the conduit 86. The conduit 86 comprises a heavy-duty flexible tube 393, within which is disposed a heavy-duty rubber hose 394, having its one end securely fastened over one nipple 387 and its other end extending into a union joint suitably connected to the breech 87 of the gun 88.

In the simplest embodiment, the gun 88 serves to project the material at high velocity against an anvil, as fully described in my copending divisional application Serial Number 362,563, whereby the material is disrupted by impact. To propel the material through the gun 88 air pressures as high as 500 pounds per square inch to the order of 1000 to 1500 pounds per square inch, or higher, may be utilized, this compressed air being supplied to the gun from the tank 81. The gun 88 may include a booster jet, indicated in Figure 3 by the diagonal arrow against the diagrammatically indicated gun, and this jet may be connected to a conduit 434a (see Figure 3) which is tapped into the main air pressure conduit 189 ahead of the regulator 190, so that if desired air may be delivered to the jet under a pressure either higher or lower than that under which the air flows to the lower tank 81, thereby to permit adjustment to secure the optimum qualitative-quantitative output. A manually operated valve 436 is interposed in the conduit 434a to control the flow of air to the jet and this valve is preferably closed and opened when the valve 85 at the outlet of the lower tank 81 is closed and opened. A regulator may be interposed in the conduit 434a if desired. The gun 88 may be of various embodiments, and more than one gun may be utilized, as fully described in my copending divisional application Serial Number 362,563.

As before mentioned, interlock means are provided, so constructed and arranged that certain parts of the apparatus are permitted to operate only when certain other parts are in a predetermined relation. Figure 13 shows an electrical diagram of the parts comprising the interlocking means and also parts comprising signaling means.

The devices shown in Figure 13, together with their relation to other parts by which they are controlled or which they control, are as follows. The switch housing 243 carried by and for movement with the operating lever 239 on the solids inlet valve 70, contains two mercury switches 625 and 626. Rotatable by the vane of the high level control 72 of the hoist tank are two mercury switches 627 and 628, and rotatable by the vane to operate as follows. A master switch 655 controls the energization of main line wires 656 and 657, and all of the electrically operated parts of the apparatus receive electrical energy from these line wires. To start the apparatus, the master switch 655 is first closed. Assuming material is already in the new-materials container 50, a motor switch 658 is closed to cause energization of the motor 56 to start operation of the elevator 54. Simultaneously the light 57, in shunt with the motor 56, is energized, to indicate operation of the elevator 54. The circuit of the motor 56 and lamp 57 is from line wire 656, through switch 658, the armature of the motor 56 and the filament of the lamp 57 in parallel, through the closed contacts of the mercury switch 645 of the high level control 61, through a conductor 660 connected to the other line wire 657. Thus it will be obvious that the operation of the motor 56 is dependent upon the position of the switch 645 contained in the high level control 61, the construction being such that when the level of material falls below the low level control 62, the switch 645 is operated to cause energization of the motor 56, and when the level of the material rises to the high level control 61, the switch 645 is operated to interrupt the circuit of the motor 56.

The operation of the motor 67 of the elevator 63 is dependent upon the position of the high level control 72 on the hoist tank 71, and on the position of the solids valve 70, which latter is in turn controlled by the pressure responsive device 258, responsive to the presence or absence of a pressure within the hoist tank 71. The connections are such that in order to effect operation of the elevator 63, the valve 70 must have been opened (which requires zero pressure in the hoist tank 71), and the level of the material within the hoist gized, the core 251 has been withdrawn from the path of the levers 239 and 246.

With the operating lever 239 of the solids inlet valve 70 in closed position, the casing 243 will be rotated, so that the mercury in the switch 625 bridges the terminals 625b and at the same time unbridges the terminals 625a. Unbridging of the terminals 625a prevents operation of the motor 67 when the solids valve 70 is closed. With material in the hoist tank 71 at a level a desired amount above the lower end of the tube 219, the vane 257 of the low level control 73 will rotate the mercury switch 630, so that the mercury will bridge the terminals 630a. Then, if it is desired to hoist material, the operating lever 377 of the operating means 356 is moved to "fill" position, so that the valve 80 is open, while the valve 83 between the upper and lower tanks is closed, and the operating lever of the three-way valve 182 is moved manually to "air input, hoist" position, thus rotating the mercury switch 631, so that the mercury will bridge the terminals of this switch. The opening movement of the valve 80 causes the mercury in the switch 636 to bridge the terminals 636a. When all this has been done, the solenoid 161 will be energized, thus opening the valve 160, so that air may flow from the waste air tank 149 to the hoist tank 71. The circuit for the solenoid 161 is from the line wire 656, through the solenoid 161, a conductor 669, the contacts 636a, a conductor 670, the switch 631, a conductor 671, the contacts 630a, a conductor 672, the contacts 625b, and a conductor 673, to the line wire 657. It is of course clear that open position of any one of the switches in series with the solenoid 161 will prevent energizing of the solenoid. preventing air supply from the valve 160 unless all is in readiness.

When enough material has been hoisted from the hoist tank 71, so that the level of the material falls below the axis 256 of the vane 257 of the low level device 73, the vane 257 will rise, thus rotating the switches 629 and 630, the mercury of the switch 630 now bridging the terminals 630b, and the mercury in the switch 629 now bridging the terminals of that switch. Bridging of the terminals 630b lights a signal lamp 678, which may be of amber color, to indicate that a low level has been reached, the terminals 630b and the lamp 678 being interposed in series in conductor 680, connected at its ends to the line wires 656 and 657. The interruption of terminals 630a, interrupts the previously traced circuit of the solenoid 161, thereby causing closure of the air inlet valve 160. At the same time, bridging of the terminals of the switch 629 causes energization of the solenoid 172, thereby causing opening of the blow-off valve 171. The solenoid 172 is energized from the line wire 656, a conductor 681 in which the solenoid is interposed, a conductor 682, through the terminals of switch 629, through conductor 680, to the line wire 657. Closing of the inlet valve 160 and opening of the blow-off valve 171 of course relieves the pressure in the hoist tank 71 and hoisting of material ceases.

Material having been hoisted into the upper feed tank 79 from the hoist tank 71, the operating lever 377 of the operating means 356 is then moved along the quadrant 374 from "fill" position to "compress" position, thus causing closure of the valve 80 at the inlet of the upper tank 79. The valve 83 between the upper and lower tanks remains closed. With the valve 83 closed, the mercury switch 651 carried by the casing 650 rotatable with the valve 83, is in such position that the mercury bridges the terminals 651a of the switch 651, causing energization of a green light 685, and the green light is energized at all times when the valve 83 is tightly closed. The green lamp 685 and the terminals 651a are interposed in series in a conductor 684 connected at its ends so as to be energized from the line wires 656 and 657. Closing of the valve 80 causes rotation of the switch casing 635, and effects shifting of the mercury switches 636 and 637, so that the mercury within the switch 636 unbridges the terminals 636a and bridges the terminals 636b, and the mercury in the switch 637 bridges the terminals of that switch. Bridging of the terminals 636b completes a circuit for the solenoid 172, from line wire 657, through a conductor 686 in which the terminals 636b are interposed, to the conductor 681, through the solenoid 172, to the line wire 656. This insures that the blow-off valve 171 will be open when the valve 80 is closed, so that even if air under pressure seeped into the hoist tank 71, it could not set up pressure that could cause hoisting of material at this time, which would be undesirable, because the valve 80 is closed, and hoisted material would be blown into the bag 283. The control lever of the valve 195 is now moved to "compress" position, such movement causing rotation of the switch casing 640 movable with the operating lever of the valve, in such direction that the mercury is moved from bridging relation with respect to the terminals of the switch 641, thereby insuring deenergization of the solenoid 379 so that the core 380 prevents movement of the lever 377 to the "dump" position at this time.

After the pressure in the upper tank 79 has been raised to or substantially near the pressure in the lower tank 81, the operating lever of the valve 195 is moved from "compress" position to "equalize" position, such movement causing rotation of the casing 640, so that the mercury bridges the terminals of the mercury switch 641, and causes energization of the solenoid 379, thereby withdrawing the core 380 from the path of movement of the indicating portion 376 of the operating lever 377. The solenoid 379 is so energized since it and the switches 641 and 637 are connected in series in a conductor 687 the ends of which are connected to the line wires 656 and 657, it being remembered that the switch 637 was previously closed by closure of the valve 80. The operating lever 377 may now be moved to "dump" position, whereupon the valve 80 at the inlet of the upper feed tank 79 remains closed, and the valve 83 between the upper and lower tanks is opened, such movement of the valve 83 causing movement of the casing 650, so that the mercury in the switch 651 bridges the terminals 651b, thereby causing energization of a red light 688, which is interposed in series with the terminals 651b in a conductor 689 the ends of which are connected to the line wires 656 and 657. The red light 688 indicates that material is being dumped. The green lamp 685 is out, by reason of opening of terminals 651a, if the valve 83 is open or is not tightly closed, and the red lamp 688 is lit when the valve 83 is open or not tightly closed.

After the material has been dumped from the upper feed tank 79 to the lower tank 81, the operating lever 377 of the operating means 356 is moved along the quadrant to "blow-off" position, in which position the valves 80 and 83 are still closed, and the operating lever of the valve 195 is moved from "equalize" position to "dead" position, the latter action immediately causing deenergization of the solenoid 379, so that the core 380 is moved by the spring 380a to the position wherein it prevents the operating lever 377 from being moved to "dump" position. The movement of the operating lever of the valve 195 to "dead" position effects deenergization of the solenoid 379, since in that position the mercury in the switch 641 is moved from bridging relation with respect to the terminals of the switch. The valve 85 at the outlet of the lower tank 81 is then opened to permit the fluid under pressure in the lower tank to convey the material within the lower tank to the gun breach 87 and gun 88.

To give a signal before the material is completely exhausted from the lower tank 81, the switch 388 is so arranged in the outlet conduit of this lower tank that when the material falls below the pivot of the vane 389, the vane may be spring pressed or otherwise moved to a substantially horizontal position, so as to energize a red light 690, and to cause ringing of a bell 691, the circuit for the lamp 690 being from the line wire 656, the conductor 680, a conductor 693, through the lamp 690 and the switch 390, to the conductor 660, to the line wire 657, and the bell 691 being connected in shunt with the lamp 690, and if desired, controllable by a further switch 694.

To relieve the upper tank of pressure, so that this tank may be in condition to receive another charge of material from the hoist tank 71, the operator moves the operating lever of the valve 175 to the position indicated by the letter a, thus permitting flow of air along the conduit 179, through the body of the valve 175, through the conduit 152, to the waste air tank 149, until the safety valves 150 indicate that the tank 149 has received its full charge, at which point the operator moves the operating lever of the valve 175 to the position indicated by the letter b, to permit the remaining air to flow from the upper tank 79 through the conduit 179, through the body of the valve 175, and through the conduit 173, to the air separator 167, through the muffler 169, and to the atmosphere. After all the air under pressure has been exhausted from the upper tank 79, the operating lever 377 may be returned to "fill" position, thus opening the valve 80, so that the upper tank 79 is in condition to receive another charge of material.

Assuming that the valve 162 is in the "dead" position, that the solids valve 70 is open, and that the low-level control 73 is in the position corresponding to low level of material in the hoist tank, the terminals of the switch 632 associated with the valve 162 will be bridged, and the terminals of the switch 626 associated with the solids valve 70 will also be bridged. This completes a circuit for the solenoid 172 from the line wire 657, the conductor 695 in which the switches 626 and 632 are interposed in series, to the conductor 682, to the conductor 681, through the solenoid 172, to the line wire 656. There is also a circuit for the solenoid 172 from the line wire 657, the conductor 680, the conductor 682 in which the switch 629 is interposed, the conductor 681, through the solenoid 172, to the line wire 656. Assuming that the elevator motor 67 is set in operation, as hereinbefore described, and the level of material rises in the hoist tank 71, when the level rises enough to cause the low level control 73 to respond, the switch 629 opens, but the solenoid 172 remains energized as long as the switches 626 and 632 are closed, and even after the switches 626 and 632 are opened, the solenoid 172 still will remain energized, if the valve 80 is in such position that the terminals 636b of the switch 636 are bridged.

Besides the automatic control of the solenoid 172 for the purpose of opening the blow-off valve 171, to relieve pressure in the hoist tank 71, the pressure may be relieved manually by moving the control lever of the valve 162 into the "blow-off" position, whereby the air may flow out through conduits 74 and 164, through the valve 162, to the conduit 166, to the conduit 173, and thence to atmosphere, at the muffler 169.

The valve 85 is closed when initially charging the apparatus, and may also be closed for interrupting the process temporarily without relieved pressure on the lower feed tank 81, or at the end of a run prior to a subsequent initial charging or beginning of operations. In other words, it is closed before initially charging, or at the end of a day's run, or for temporary interruption, and it is opened when beginning operations, as at the beginning of a day, or after an interruption as for inspection or adjustment of other equipment.

While the material in the lower feed tank 81 is being ground, the hoist tank 71 will have again been filled, with either new material or with a mixture of new and partly ground material from overage from the screen 96, and this charge will have been hoisted, and all is in readiness to "dump" the same into the tank 81 when the "low level" responsive device in the lower tank 81 indicates sufficient evacuation to receive the next charge from the upper feed tank 79.

From the foregoing description of the apparatus and the operation thereof, it will be apparent that operation of the apparatus and process are enabled to be continuous, but interruptable when desired.

From the foregoing it also will be apparent to those skilled in the art that the illustrated apparatus embodying my invention provides new and improved apparatus for carrying out the processing of materials, and, accordingly, accomplishes the principal object of my invention. On the other hand, it also will be obvious to those skilled in the art that the illustrated embodiment of my invention may be variously changed and modified, and features thereof, singly or collectively, embodied in combinations other than those illustrated, without departing from the spirit of my invention or sacrificing the advantages thereof, and accordingly, that the disclosure herein is illustrative only, and that my invention is not limited thereto.

I claim:

1. In combination: a material feed tank having an inlet through which material may be received; solids inlet valve means controlling said inlet for said feed tank; means, including a conveyer tank, constructed and arranged to convey material to said feed tank inlet by means of fluid under pressure; said conveyer tank having a fluid inlet through which fluid under pressure may be admitted, and also having a solids inlet through which material may be received; fluid inlet valve means controlling said fluid inlet; solids inlet valve means controlling said solids inlet of said conveyer tank; means for operating said solids inlet valve means of said conveyer tank separately from said fluid inlet valve means; means, responsive to the position of said solids inlet valve means of said conveyer tank, so constructed and arranged that actuation of said fluid inlet valve means to open position is prevented if said solids inlet valve means of said conveyer tank is open; means responsive to the level of material in said conveyor tank, so constructed and arranged that actuation of said fluid inlet valve means is prevented if the level of material in said tank is below a predetermined level; and means, responsive to the position of said solids inlet valve means for said feed tank, so constructed and arranged that actuation of said fluid inlet valve means is prevented if said solids inlet valve means for said feed tank is open less than a predetermined amount.

2. In combination: a material feed tank having an inlet through which material may be received; solids inlet valve means controlling said inlet for said feed tank; means, including a conveyer tank, constructed and arranged to convey material to said feed tank inlet by means of fluid under pressure; said conveyer tank having a fluid inlet through which fluid under pressure may be admitted, and also having a solids inlet through which material may be received; fluid inlet valve means controlling said fluid inlet; solids inlet valve means controlling said solids inlet of said conveyer tank; means for operating said solids inlet valve means of said conveyer tank separately from said fluid inlet valve means; and control means for said fluid inlet valve means, including means responsive to the position of said solids inlet valve means of said conveyer tank, and including means responsive to the level of material in said conveyer tank, and including means responsive to the position of said solids inlet valve means for said feed tank, said control means being so constructed and arranged that said fluid inlet valve means may be actuated to open position provided said solids inlet valve means for said feed tank is open, and said solids inlet valve means for said conveyer tank is closed and the level of material in said conveyer tank is above a predetermined level.

3. In combination: a material feed tank having an inlet through which material may be received; solids inlet valve means controlling said inlet for said feed tanks; means, including a conveyer tank, constructed and arranged to convey material from said conveyor tank to said feed tank inlet by means of fluid under pressure; said conveyer tank having a fluid inlet through which fluid under pressure may be admitted, and also having a solids inlet through which material may be received; fluid inlet valve means controlling said fluid inlet; solids inlet valve means controlling said solids inlet of said conveyer tank; means for operating said solids inlet valve means of said conveyer tank; control means for said fluid inlet valve means, including means responsive to the position of said solids inlet valve means of said conveyer tank, and including means responsive to the level of material in said conveyer tank, and including means responsive to the position of said solids inlet valve means for said feed tank, said control means being so constructed and arranged that said fluid inlet valve means may be actuated to open position provided said solids inlet valve means for said feed tank is open, and said solids inlet valve for said conveyer tank is closed, and the level of material in said conveyer tank is above a predetermined level; and means, responsive to the position of said solids inlet valve means for said feed tank, constructed and arranged to open said conveyer tank to atmosphere if said solids inlet valve means for said feed tank is in closed position.

4. In combination: a material feed tank having an inlet through which material may be received; solids inlet valve means controlling said inlet for said feed tank; means, including a conveyer tank, constructed and arranged to convey material from said conveyer tank to said feed tank inlet by means of fluid under pressure; said conveyer tank having a solids inlet through which material may be received; solids inlet valve means controlling said solids inlet of said conveyer tank; means for operating said solids inlet valve means of said conveyer tank; blow-off means for opening said conveyer tank to atmosphere; and control means for said blow-off means, including means responsive to the position of said solids inlet valve means of said conveyer tank, and including means responsive to the level of material in said conveyer tank, and including means responsive to the position of said solids inlet valve means for said feed tank.

EDWIN L. WIEGAND.